Oct. 27, 1925. 1,559,526
I. H. OSBORN
CULTIVATOR
Filed Sept. 3, 1924  2 Sheets-Sheet 1
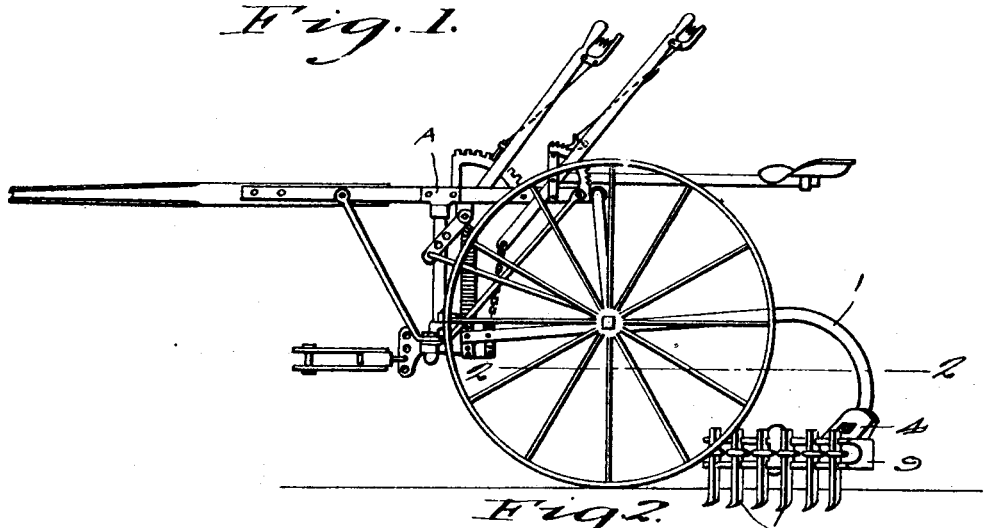
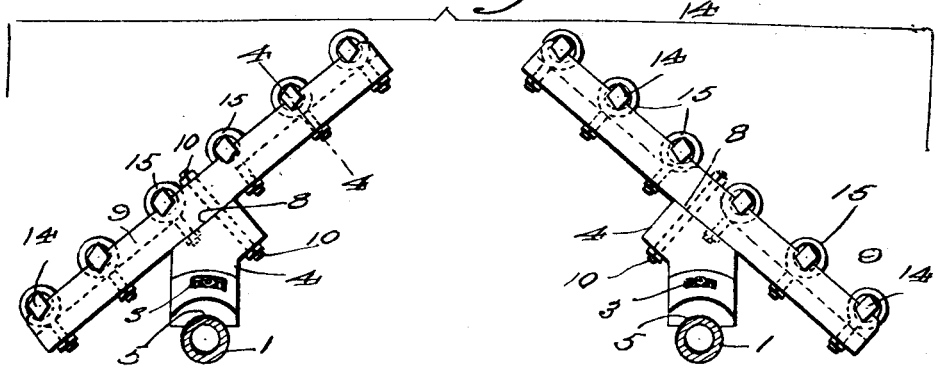
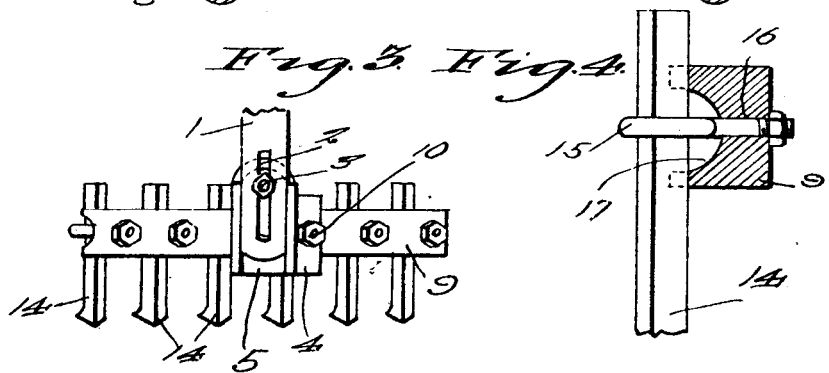
I. H. Osborn INVENTOR

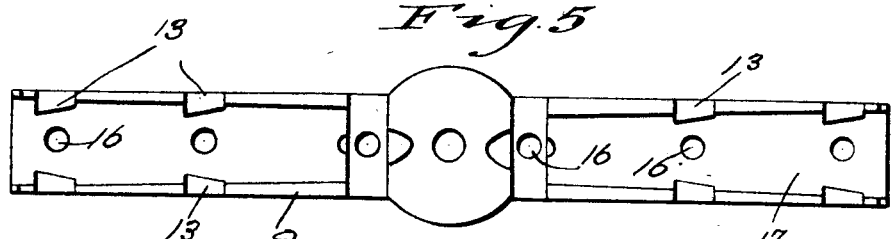
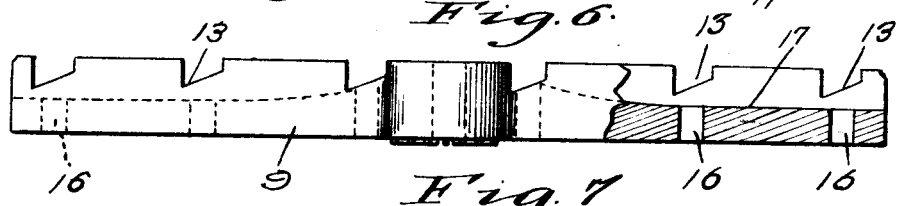
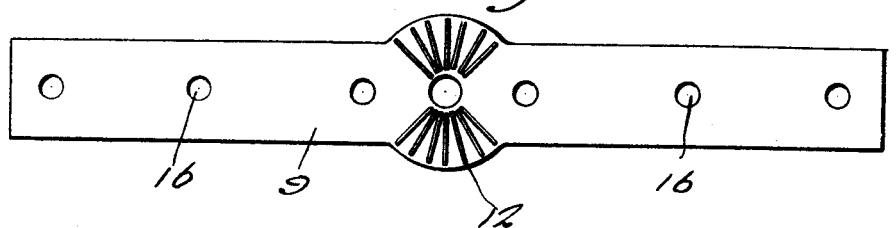
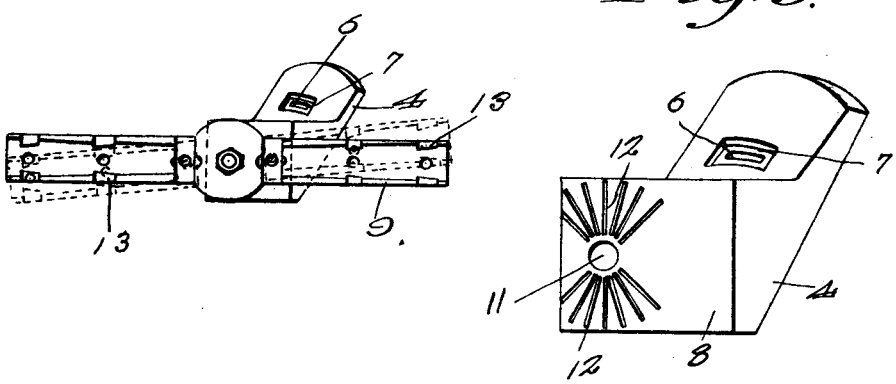

Patented Oct. 27, 1925.

1,559,526

UNITED STATES PATENT OFFICE.

IVAN H. OSBORN, OF FORT SMITH, ARKANSAS.

CULTIVATOR.

Application filed September 3, 1924. Serial No. 735,709.

*To all whom it may concern:*

Be it known that I, IVAN H. OSBORN, a citizen of the United States, residing at Fort Smith, in the county of Sebastian and State of Arkansas, have invented new and useful Improvements in Cultivators, of which the following is a specification.

This invention relates to improvements in cultivators, the general object of the invention being to provide means for adjusting the plow bars so that the plows can be made to run close to the plants and also can be made to dig deep close to the plants or a distance from the plants and also to provide means for tilting the plow bars so that the device can be used for cultivating plants placed on ridges as well as plants placed for flat cultivation.

Another object of the invention is to provide improved means for supporting the plows on the bars.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a cultivator provided with my invention.

Figure 2 is a section on line 2—2 of Figure 1.

Figure 3 is a rear view of one of the plow gangs.

Figure 4 is a section on line 4—4 of Figure 2.

Figure 5 is a front view of one of the plow bars.

Figure 6 is an edge view with parts in section of the plow bar.

Figure 7 is a rear view.

Figure 8 is a view showing how the plow bar can be adjusted on its shoe.

Figure 9 is a perspective view of a shoe.

In these views, the plow beams are shown at 1, the beams having the slots 2 in their lower ends for receiving the bolts 3 for holding the shoes 4 to the beams. These shoes have curved recesses 5 therein for receiving the front curved face of the beams and each shoe is provided with a slot 6 to receive the bolt 3 and a recess 7 to receive the head of the bolt. From this construction it will be seen that the shoe can be adjusted toward and away from the ground on the beam and it also can be adjusted in an arc of a circle about the beam. Each shoe is provided with an inclined front face 8 for receiving a part of the rear face of the plow bar 9. The plow bar is connected with the shoe by means of the bolt 10 which passes through a hole 11 in the shoe and the abutting faces of the shoe and bar are roughened, as at 12, to prevent one part slipping on the other after the bolt has been tightened. The bolt acts as pivot, after its nut has been loosened, so that the bar can be rocked thereon and thus the bar can be held in a horizontal position as shown in full lines in Figures 8 or in a tilted position as shown in dotted lines in said figure.

Each bar is provided with notches 13 for receiving the plow or teeth 14 and the plows or teeth are engaged by the eyes of the eye bolts 15 which have their stems passing through holes 16 formed in the bar in alignment with the notches. The bar is provided with curved channels 17 in its front face which extend longitudinally of the bar for receiving the inner portions of the eyes of the bolts.

From the foregoing, it will be seen that the plow bars can be adjusted toward and away from the ground by moving the bolts 3 in the slots 2 of the beams and the two bars can also be adjusted to regulate the space between their inner ends, as shown in Figure 2, by moving the shoes on the bolts 3 after loosening the nuts of the bolts, the shoes moving about an arc on the beams. The plow bars can also be adjusted on the bolts 10 so that the teeth or plows can be held in a horizontal position as shown in Figure 3 or in a tilted position, in this latter position the teeth can cultivate plants which are placed on ridges. This adjustment of the plow bars will also permit shallow or deep cultivation close to the plants.

The shoes are arranged as right and left, but the plow bars are interchangeable.

Figure 1 shows the beams as attached to an ordinary cultivator which is shown generally at A, but it will, of course, be understood that the invention can be used with other types of cultivators and implements, if desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with an implement beam having a longitudinally extending slot in its lower end, an angle-shaped shoe having a sloping rear face a curved recess in the said rear face for receiving the front part of the lower end of the beam, said shoe having a transverse slot therein, a bolt passing through the slots for adjustably connecting the shoe to the beam, the front face of the shoe being inclined in a vertical plane, a plow bar abutting said face and a single bolt passing through the bar and shoe for adjustably clamping the bar to the shoe.

In testimony whereof I affix my signature.

IVAN H. OSBORN.